United States Patent [19]
Yamagata et al.

[11] Patent Number: 6,150,931
[45] Date of Patent: Nov. 21, 2000

[54] MOBILE UNIT DETECTION SYSTEM

[75] Inventors: Tetsuo Yamagata; Hajime Tabata, both of Saitama, Japan

[73] Assignee: Honda Giken Kogyo Kabushiki Kaisha, Tokyo, Japan

[21] Appl. No.: 09/317,192

[22] Filed: May 24, 1999

[30] Foreign Application Priority Data

| Jun. 5, 1998 | [JP] | Japan | 10-156986 |
| Jun. 5, 1998 | [JP] | Japan | 10-156987 |

[51] Int. Cl.[7] .................................................. B60Q 1/00
[52] U.S. Cl. ........................ 340/435; 340/903; 340/933; 340/93
[58] Field of Search ................................ 340/435, 425.5, 340/436, 903, 902, 935, 465, 475, 901, 933

[56] References Cited

U.S. PATENT DOCUMENTS

| 5,424,726 | 6/1995 | Beymer | 340/902 |
| 5,428,544 | 6/1995 | Shyu | 364/436 |
| 5,589,827 | 12/1996 | Scurati | 340/901 |
| 5,652,705 | 7/1997 | Spiess | 364/436 |
| 5,847,661 | 12/1998 | Ricci | 340/902 |
| 5,933,093 | 8/1999 | Austin, II | 340/902 |
| 6,054,936 | 4/2000 | Yamagata et al. | 340/903 |

FOREIGN PATENT DOCUMENTS

| 2216600 | 8/1990 | Japan . |
| 7244800 | 9/1995 | Japan . |

*Primary Examiner*—Jeffery A. Hofsass
*Assistant Examiner*—Toan Pham
*Attorney, Agent, or Firm*—Birch, Stewart, Kolasch & Birch, LLP

[57] ABSTRACT

A mobile unit detection system or information system in which the existence of a car or other mobile unit which must be paid attention to can be detected only upon receiving a necessary signal. The mobile unit detection system or information system detects a mobile unit through communication between the car and the mobile unit. The car includes a device for judging the operating condition of the car and transmitting a detection signal based on the result. The mobile unit may transmit a response signal upon receiving the detection signal so that the car is able to detect the existence of the mobile unit.

17 Claims, 5 Drawing Sheets

MOBILE UNIT DETECTION SYSTEM

BACKGROUND OF THE INVENTION

1. Field of the Invention

The present invention relates to a system for a vehicle for detecting a mobile unit. In particular, the present invention relates to an information system in which drivers are informed of the existence of cars in the same or opposite lanes from each other.

2. Description of the Background Art

Various kinds of detection methods for detecting other cars or other mobile units existing in the vicinity of a car being operated have been offered.

For example, in a method described in the Japanese Patent Laid-open No. Hei 2-216600, a car, being operated while monitoring for warning radio waves includes a receiving device therein. The car is able to detect the existence of other mobile units by the reception of warning radio waves which are being constantly transmitted by transmitting devices provided in the other mobile units.

Furthermore, in a method described in Japanese Patent Laid-open No. Hei 7-244,800, even if the warning radio waves are received as described in the above example, judging from the operating condition of the car, some are not necessary, and only necessary ones are displayed.

In the case where there is a car intending to make a turn crossing over the opposite lane and another car proceeding straight ahead, the driver of the car proceeding straight ahead unable to determine whether or not the driver of the car intending to make a turn has sensed the existence of the car proceeding straight ahead. If the driver of the car proceeding straight ahead operates the car assuming that the driver of the car intending to make a turn has sensed the existence of the car proceeding straight ahead, the operation of the cars becomes speculative.

In the examples mentioned above, the transmitting device provided in the mobile unit is constantly transmitting a warning radio wave. When the number of such mobile units is increased, warning radio waves transmitted by them may cause a jammed state of the radio waves. Furthermore, all of the radio wave will be received in the receiving devices, making the selection of necessary signals difficult.

Furthermore, the transmitting devices are constantly transmitting warning radio waves which in many cases results in useless consumption of energy.

SUMMARY OF THE INVENTION

The present invention was invented in consideration of such circumstances, and the purpose of the present invention is to offer an energy saving type of mobile unit detection system or information system for cars located in opposing lanes or in the same lane in which the existence of cars can be confirmed by one or both of the operators through communication between, for example, a car intending to make a turn crossing over the opposite lane and a car which is proceeding straight ahead.

In order to achieve the above-mentioned purpose, a first aspect of the present invention includes a mobile unit detection system in which a car on the detection side detects the existence of a mobile unit on the detected side with the communication between the car on the detection side and the mobile unit on the detected side. The car on the detected side includes an operating condition judging means for judging the condition of the car on the detection side, and it issues a detection signal based on the judgment result of the operating condition judgment means. Furthermore, the mobile unit on the detected side issues a response signal upon receiving the detection signal and the car on the detection side detects the existence of a mobile unit on the detected side with the reception of a response signal.

Since a detection signal is only issued based on the judgment result of the operating condition judgment means from the car on the detection side, and a response signal is issued from the mobile unit on the detected side upon receiving the detection signal, there is no issuance of radio waves from the mobile unit on the detected side except when there is necessity to do so. Therefore, a jammed state of the radio waves and useless consumption of energy can be avoided, making it possible to only detect the existence of a mobile unit which must be paid attention to.

In order to achieve the above-mentioned purpose, a second aspect of the present invention includes an information system for cars in opposite lanes in which the existence of cars is identified on sides of the cars through the communication between a car which is intending to make a turn crossing over the opposite lane and another car which is o proceeding straight ahead on the opposite lane. The car intending to make a turn transmits a detection signal when it prepares for a turn. The car proceeding straight ahead transmits a response signal upon receiving the detection signal. If the response signal is received, the operator of the car intending to make a turn is informed of the existence of the car proceeding straight ahead and at the same time the car transmits an information execution signal. Therefore, the car proceeding straight ahead, upon receiving the information execution signal, informs its driver of the existence of the car intending to make a turn. The fact that information is given to the driver of the car proceeding straight ahead means that the driver of the car proceeding straight ahead is able to confirm that the driver of the car intending to make a turn has sensed the existence of the car proceeding straight ahead. This makes it possible to prevent speculative operation of the cars.

Since a response signal is only transmitted when a detection signal is transmitted from the car intending to make a turn, a radio wave is not transmitted from the car proceeding straight ahead except when necessary. Therefore, a jammed state of radio waves and unnecessary consumption of energy can be avoided. Furthermore, the existence of a car proceeding straight ahead which must be paid attention to can be detected only upon receiving a necessary signal.

The car intending to make a turn transmits a detection signal only when it enters the preparation for a turn. It does not transmit a signal constantly, thereby avoiding unnecessary consumption of energy.

In the mobile unit detection system according to the first aspect of the present invention, the operating condition judgment means judges a left-turn or a right turn of the car on the detection side.

During straight ahead travel, an operator is looking forward, so it is easy for a driver to detect a mobile unit which must be paid attention to. There is no need to pay much attention to other cars. However, at the time of a left-turn or a right-turn, there can be a case where a mobile unit that must be paid attention to is in a blind spot. In such a case, if there is a mobile unit on the detected side toward which the car is preparing to turn, the car is able to receive a response signal from the mobile unit on the detected side by the issuance of a detection signal according to the judgment of a left-turn or a right-turn by operating condition judgment means. Therefore; it is possible to detect the existence of a mobile unit which must be paid attention to at the time of need.

In a mobile unit detection system according to the first aspect of the present invention, the operating condition judgment means determines whether there is a left-turn or a right-turn of the car on the detection side the operation of the blinker continues for a predetermined period of time. It is then determined whether a left-turn or a right-turn is going to be made and a detection signal is issued. A response signal is then issued from a mobile unit which must be paid attention to. Therefore; it is possible to detect the existence of a mobile unit on the detected side which must be paid attention to at a time when attention is needed.

In the mobile unit detection system according to the first aspect of the present invention, the operating condition judgment means detects the decelerated state of the car before or after the operation of the blinker and judges the left-turn or the right turn of the car on the side of detection.

When the car is decelerated from the speed before or after the operating time of the blinker, a detection signal is issued judging that a left-turn or a right-turn is going to be made. A response signal is then issued from a mobile unit on the detected side which must be paid attention to. Therefore, it is possible to detect the existence of a mobile unit at a time of need.

In the mobile unit detection system according to the first aspect of the present invention, the detection signal in transmitted such that it covers only the predetermined range on the side toward which the car on the detection side is going to make a left-turn or a right-turn. Therefore, a response signal is transmitted from only the mobile unit which must be paid attention to, and it is possible to detect the existence of only a mobile unit on the detected side.

In the mobile unit detection system according to the first aspect of the present invention, the car on the detection side measures the distance between the mobile unit on the detected side and the car on the detection side upon receiving the response signal.

Since the distances to mobile units on the detected side are measured upon receiving response signals, it is possible to discriminate between a mobile unit on the detected side located at a short distance which needs to be paid special attention to from other mobile units which do not require much attention.

In the information system for cars located in opposite lanes according to the second aspect of the present invention, the car intending to make a turn transmits a detection signal with regard to the preparation of a turn when a blinker switch is turned ON.

When a car intends to make a turn crossing over the opposite lane, the blinker lever is operated and the blinker switch is turned ON, which makes it possible to judge that the car has entered the preparation for a turn. Then a detection signal is transmitted for detecting a car proceeding straight ahead on the opposite lane.

In the information system for cars located in opposite lanes according to the second aspect of the present invention, the car intending to make a turn measures the distance from it to the car proceeding straight ahead and judges YES or NO dependent upon the execution of information based on the distance measured.

With regard to the car proceeding straight ahead which is not in the vicinity of the car intending to make a turn, there is no need to pay attention to it and therefore there is no need to inform the driver. Therefore, an information execution signal is not transmitted, and the useless communication can be avoided.

In the information system for cars located in opposite lanes according to the second aspect of the present invention, the information is given to the drivers by means of at least one of visual expression or acoustic expression. It is possible to inform the drivers of the existence of cars by visual expressions such as a display lamp, a character display, an image display, or by acoustic expressions such as buzzers, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

The present invention will now be described with reference to FIGS. 1–5. It is noted that like reference numerals are used throughout the several views to identify the same or similar elements.

Figure 1:
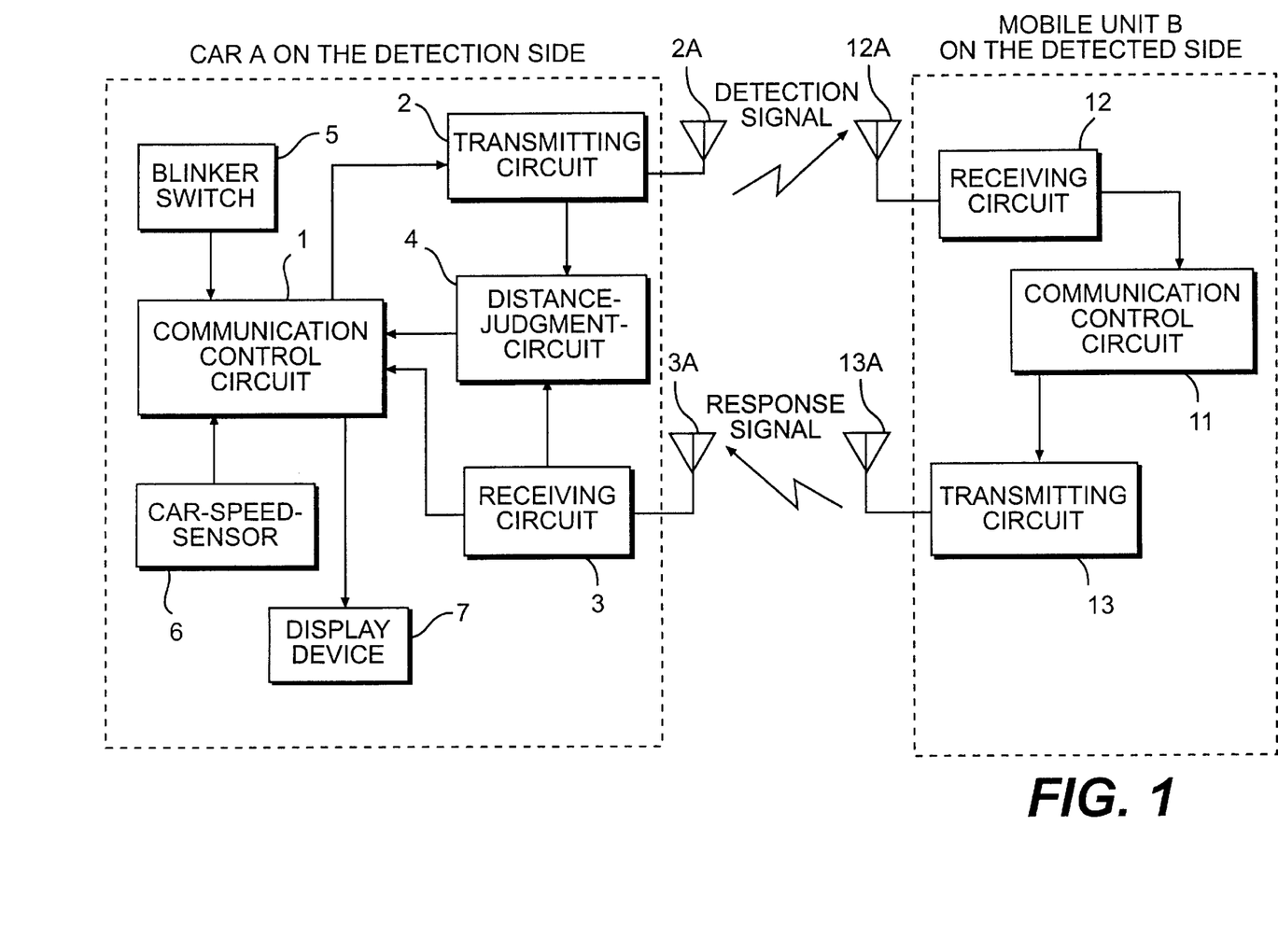
FIG. 1 illustrates a simplified block diagram of a mobile unit detection system according to the present invention.

Referring to FIG. 1, a simplified block diagram of a mobile unit detection system or an information system according to the present invention is illustrated. The descriptions are written according to a regulation in which cars should be operated on the left side of a road. Therefore, a car intending to make a right-turn must cross over the opposite lane.

The car A on the detection side may be a 4-wheeled vehicle which is larger than a 3-wheeled vehicle. The car B on the detected side may be a mobile unit which is of relatively small size such as a bicycle or a pedestrian.

A communication control circuit 1 of the car A on the detection side which may be making a right-turn gives a transmission instruction to a transmitting circuit 2. The communication control circuit 1 then inputs a signal received by a receiving circuit 3, together with a turn signal of a left-turn or a right-turn shown by a blinker switch 5, a car-speed-signal from a car speed sensor 6, and a distance judgment signal from a distance-judgment-circuit 4. The result of the signal process is output as a display signal to a display device 7.

The transmitting circuit 2 transmits a detection signal or an information-execution signal in a predetermined direction through a transmitting antenna 2a after receiving a transmission instruction from the communication control circuit 1.

A receiving circuit 3 receives a response signal transmitted from the car or mobile unit B, which may be proceeding straight ahead in the opposite lane, through a receiving antenna 3a and outputs it to the communication control circuit 1.

The distance judging circuit 4 inputs the leading edge of a detection signal from the transmitting circuit 2 and the leading edge of a response signal from the receiving circuit 3, and judges the distance between the car A on the detection side and a mobile unit on the detected side from the time difference between these two signals. The distance signal is then output to the communication control circuit 1.

The blinker switch 5 is operated by a blinker lever operated by a driver at the time of a left-turn or a right-turn.

The display device 7 informs a driver by turning ON a display lamp upon the detection of a mobile unit on the detected side. The information can be displayed with a character display or by utilizing a liquid crystal screen being used for car navigation. Furthermore, the informing method is not limited to the visual expression but it can be an acoustic expression such as a buzzer.

On the other hand, the communication control circuit 11 on the mobile unit B on the detected side inputs a detection signal received by a receiving circuit 12 through a receiving antenna 12a. The communication control circuit then transmits a transmission instruction to a transmitting circuit 13 in order to transmit a response signal. The transmitting circuit 13 transmits the response signal through a transmitting antenna 13a. The result of the signal process is output to a display device 14 as a display signal.

Figure 2:
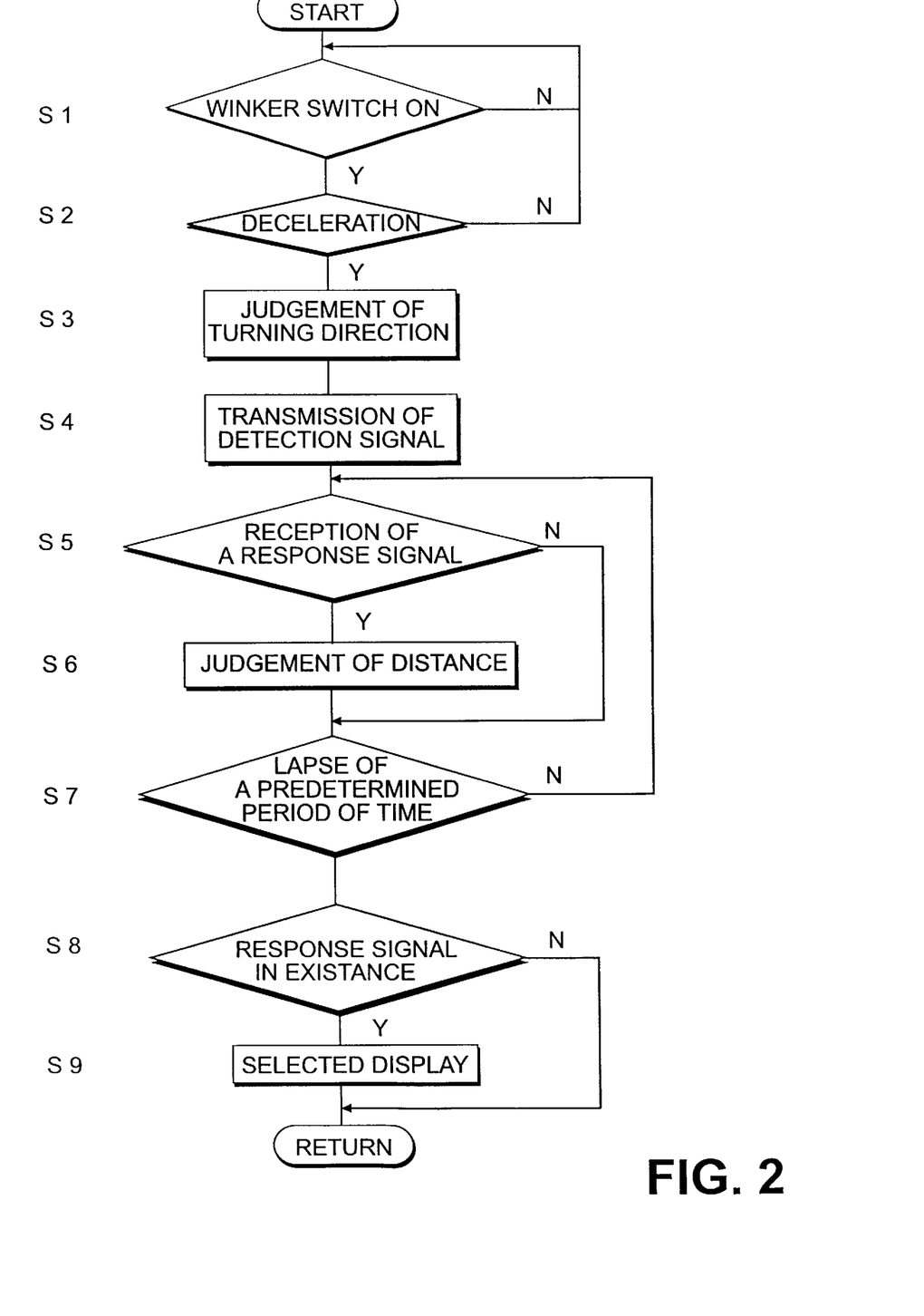
FIG. 2 illustrates a flowchart showing the control process of a car on the detection side in the mobile unit detection system according to a first aspect of the present invention.

The control process of a car A on the detection side in a mobile unit detection system according to a first aspect of the present invention will now be described with reference to FIG. 2 in the form of a flowchart for explanation.

Assuming that the car A on the detection side is in travel, at the first step (step 1), it is judged whether the blinker switch 5 is ON.

When an operator operates the blinker lever intending to make a left-turn or a right-turn, the blinker switch is turned ON. The process then proceeds to step 2, and it is judged whether or not the car has decelerated with a detection signal from car speed sensor 6. The process returns back to step 1 until the deceleration is sensed.

When the car is decelerated and the blinker switch 5 is ON, it is determined that the car is preparing to make a turn. The process then proceeds to step 3, and judges the direction of the turn, i.e., a left-turn or a right-turn.

In the next step 4, a detection signal is issued based on the direction of the turn. In the case of a left-turn, the detection signal is transmitted in a predetermined direction toward the left side of car A. In the case of a right-turn, the detection signal is transmitted in a predetermined direction toward the right side of the car A.

When the detection signal is issued, in the next step 5, it is judged whether there is a reception of a response signal. If there is a reception of the signal, the distance between the car A on the detection side and the mobile unit B on the detected side is measured from the time difference between the detection signal and the response signal (step 6). The process then waits for a predetermined period of time (step 7).

In step 6, the distance between the car A and the mobile unit B is measured from the time difference between the detection signal and the response signal; however, the distance can be measured by radar utilizing a supersonic wave, ultraviolet rays, radio waves, or other methods.

When there is no reception of a response signal, the process jumps to step 7 from step 5. After a predetermined period of time, the process returns to step 5 to make the reception of a response signal possible again. If there is a reception of a response signal in the predetermined period of time after a detection signal is issued, the measurement of the distance is performed. In some case there are multiple response signals received. In such a case the distance to each mobile unit is measured.

After the lapse of a predetermined period of time, the process proceeds to step 8, and the existence of a response signal is judged. When there is a response signal, in step 9, it is displayed that there is a mobile unit detected by the response signal. However, in this case, according to the measurement of distances in step 6, mobile units which are more than a predetermined distance away are omitted and only those within the predetermined distance are selected. The existence of each of the mobile units within the predetermined distance is displayed.

Therefore, a driver of car A on the detection side is able to sense the existence of a mobile unit within a predetermined distance and on the side toward which the car A is preparing to turn. The existence of the mobile unit is displayed on the display device 7.

Figure 3:
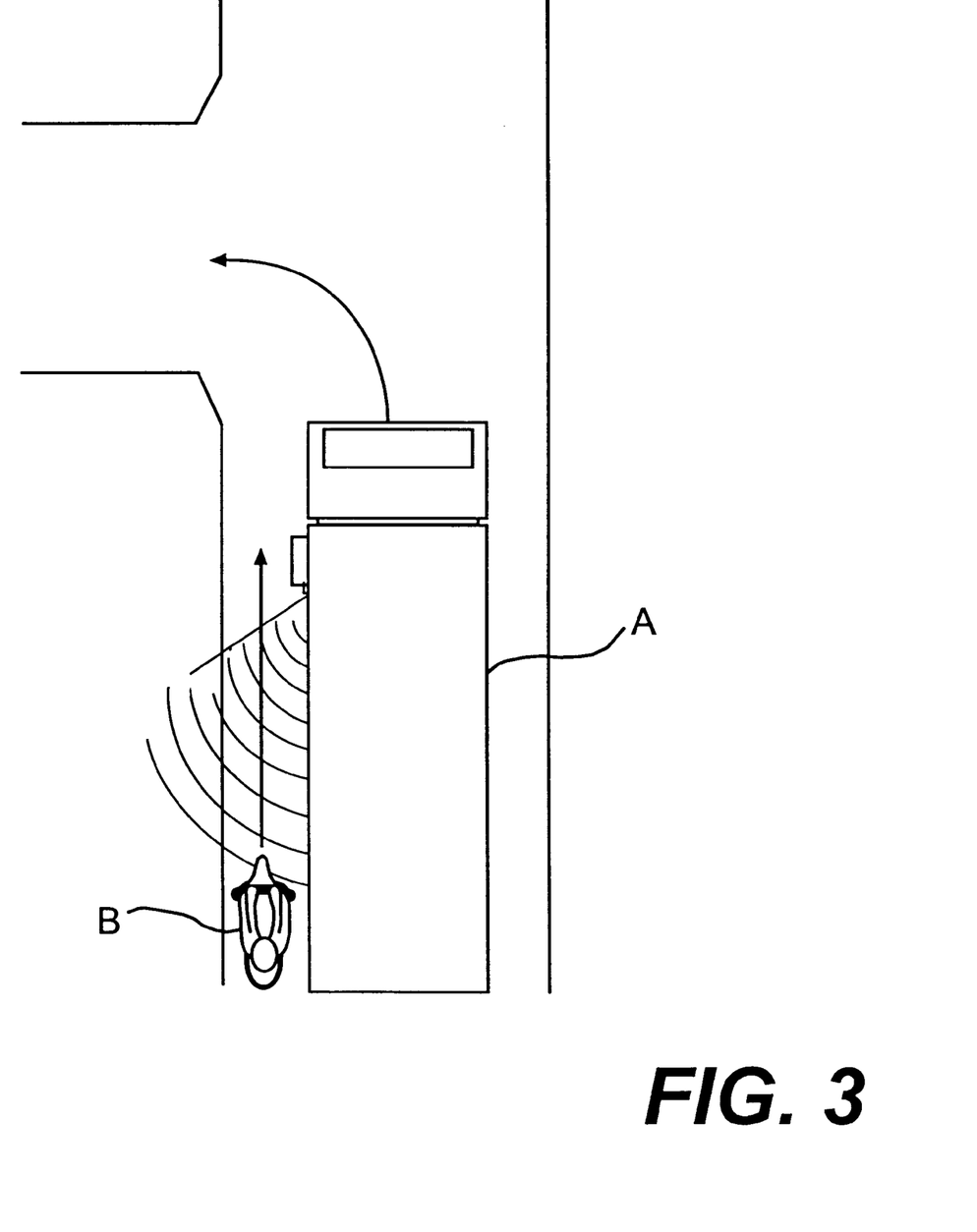
FIG. 3 illustrates an example of a car making a left turn on a T-shaped road.

For example, a concrete example of car A preparing to make a left-turn will be explained referring to FIG. 3. The car A, being assumed to be a large-sized truck, is preparing to make a left-turn at a T-shaped road. Furthermore, a mobile unit B on the detected side is assumed to be a motorcycle which is proceeding straight ahead on the left side of the large-sized truck.

In this case, when a driver of the large-sized truck A operates a blinker lever to make a left-turn, and decelerates the truck A preparing for the left-turn, a detection signal is transmitted toward the rear and left side.

When the motorcycle B receives the detection signal, a response signal is transmitted from the side of the motorcycle B.

When the large-sized truck A receives the response signal from the motorcycle B, the distance to the motorcycle B is measured, and if the motorcycle B is a short distance away, the driver of the large-sized truck A is informed this fact.

The driver of the large-sized truck A, intending to make a left-turn, is able to sense that a motorcycle B is traveling on the left side of the truck A due to the above-mentioned information.

As mentioned in the above, a mobile unit which is located in a direction which must be paid attention to when making a left-turn can be detected.

Since a response signal is issued from a mobile unit B on the detected side only when it receives a detection signal transmitted from a car A on the detection side when the car is going to make a turn, the radio wave is not transmitted from a mobile unit B on the detected side except when needed. Therefore, jammed radio waves due to an excessive number of radio waves being emitted can be avoided. Furthermore, only the existence of mobile units B which must be paid attention to are detected by the car A when a detection signal is sent.

In addition, since the mobile unit B only transmits a signal when a detection signal is received, consumption of energy by transmitting radio waves can be avoided. Furthermore, a car A on the detection side is also transmitted only in the time of need, thereby avoiding waste of energy.

In the above embodiment, when the blinker switch 5 is ON, and the car is decelerated, a turn is approximately confirmed. Therefore, a detection signal is issued. However, it is also possible to issue a detection signal after the ON state of the blinker switch 5 is continued for a predetermined period of time. This will allow the device of the present invention to be useful in other situations such as changing lanes where deceleration does not occur.

Figure 4:
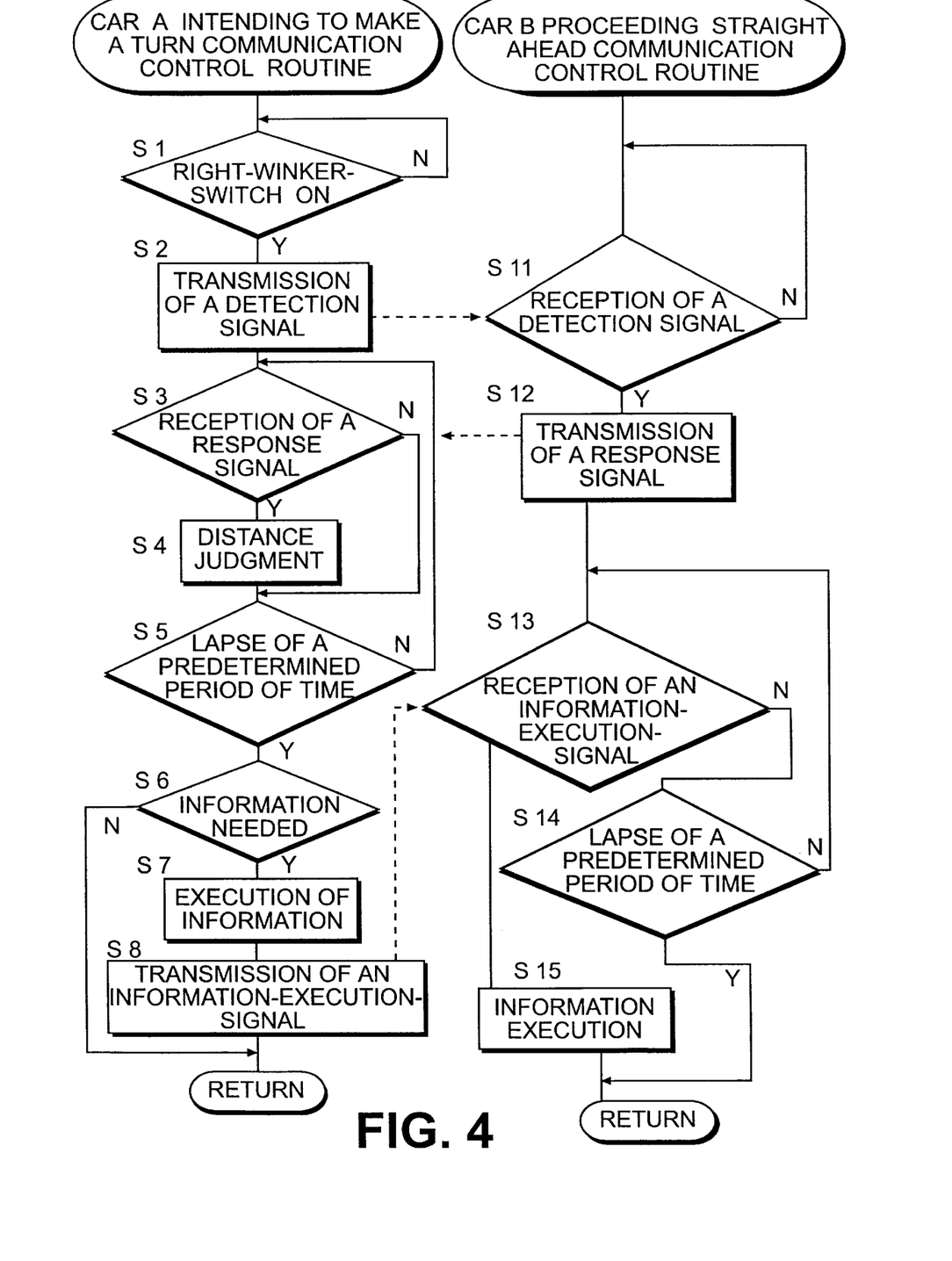
FIG. 4 illustrates a flowchart showing the control process in the information system of cars in opposite lanes according to a second aspect of the present invention.

A second aspect of the present invention will now be described with reference to FIG. 4. In the information system of cars on the opposite lanes as explained above, the control process of car A making a right-turn and car B proceeding straight ahead are simultaneously shown in the form of a flowchart.

The car A intending to make a right-turn is in travel. At first, it is judged whether or not the right blinker switch 5 is ON (step 1).

When a driver operates the blinker lever and the right-blinker-switch is ON to make a right-turn, then it is judged that the car has begun preparation for a right-turn. In step 2, a detection signal is transmitted. The detection signal is transmitted in a direction toward the front and the opposite lane of the car A which has begun preparation for a right-turn.

When a detection signal is transmitted, in step 3, it is judged whether a response signal is received or not. If there is a reception of the signal, the distance between the car A on the detection side and the mobile unit B on the detected side is measured by the distance judging circuit 4 from the time difference between the detection signal and the response signal (in step 4) and the process waits for a predetermined lapse of time (step 5).

When there is no reception of a response signal, the process jumps from step 3 to step 5. After the predetermined lapse of time, the process turns back to step 3 to obtain a state where the reception of a signal is possible. When a response signal is received in the predetermined period of time after a detection signal is transmitted, the distance between the car A and the mobile unit B is measured.

In some cases, there are more than 2 response signals. Therefore, distances are measured for all of the response signals.

After the lapse of the predetermined period of time, the process proceeds to step 6, and it is judged whether or not information is necessary. When a response signal is received and the mobile unit B proceeding straight ahead on the opposite lane is a short distance away, it is judged that the information is needed. When the distance to the mobile unit B proceeding straight ahead is far, it is judged that the information is not needed. Furthermore, when there is no response signal, the information is not needed.

When it is judged that the information is needed, the process proceeds to step 7, and the information is executed and displayed by the display device 7.

The driver of the car A intending to make a turn can therefore sense the existence of a car B proceeding straight ahead in front of and in the opposite lane from car A.

In the next step 8, an information execution signal for informing the driver that the information has been executed is transmitted. When it is judged that the information is not needed, steps, 7 and 8, are not executed, and the process exits the present routine.

On the other hand, with regard to car B, at first, in the next step 11, the process awaits the reception of a detection signal transmitted from car A which is intending to make a turn. When there is a reception of the signal, the process proceeds to step 12 and a response signal is transmitted.

The process then proceeds to step 13 and it is judged whether or not there is a reception of the information execution signal transmitted from car A. During a predetermined period of time decided in step 14, the process goes back and forth between steps 13 and 14, awaiting the reception of the information execution signal.

If the information execution signal is not received within the predetermined period of time, the process exits the present routine at step 14; however, if the information execution signal is received in the predetermined period of time, the process proceeds from step 13 to step 15 and the information to the driver of car B is executed by the display device 7.

The driver of car B proceeding straight ahead is therefore able to sense the existence of the car A intending to make a right-turn in front of and on the opposite lane from car B. At the same time, the information with regard to the existence of car B to be given to the driver of the car A has been executed and the driver of car B is able to determine that the driver of car A recognizes the existence of car B.

Figure 5:
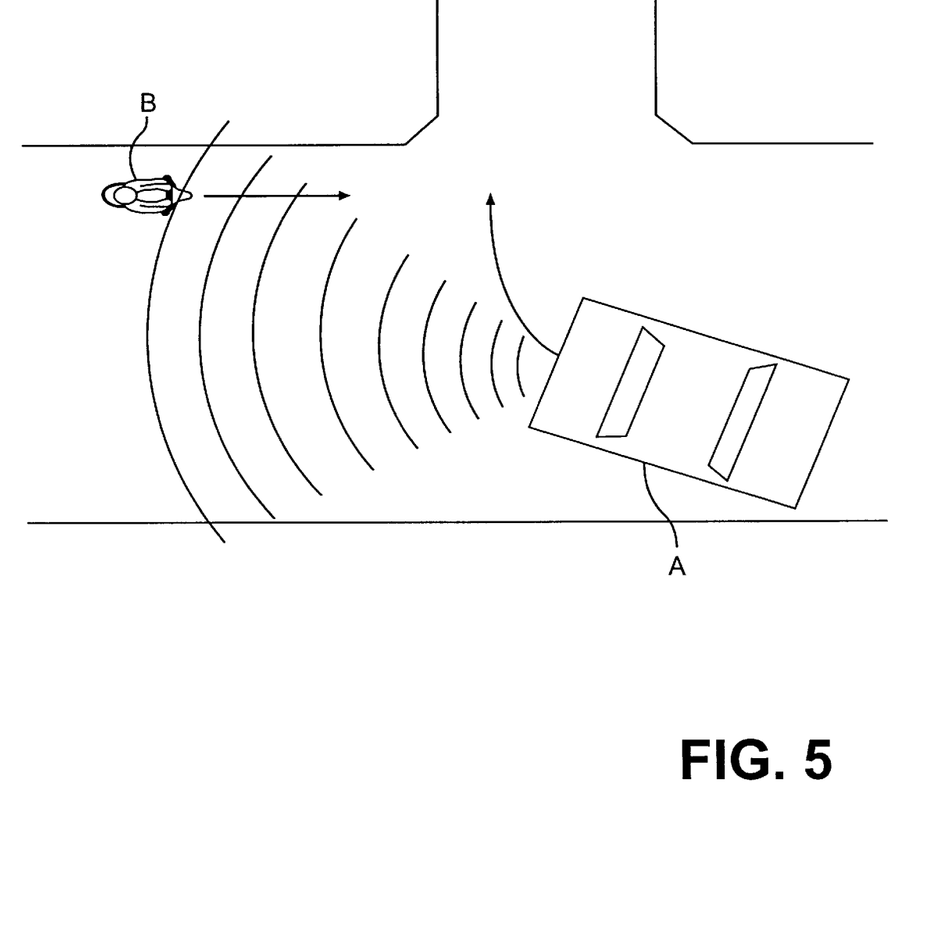
FIG. 5 illustrates an example of a car making a right turn on a T-shaped road.

For example, a concrete example in the case of a right-turn will be explained referring to FIG. 5. It is assumed that car A which is intending to make a right-turn is a 4-wheeled vehicle and it is preparing to make a right-turn on a T-shaped road. Furthermore, it is assumed that car B which is proceeding straight ahead is a motorcycle and it is proceeding straight ahead on the lane opposite the car A.

In such a case, when the driver of the car A intending to make a right-turn operates a blinker lever toward the right and begins preparation for a right-turn, a detection signal is transmitted toward the front and the opposite lane.

When the car B proceeding straight ahead receives the detection signal, a response signal is transmitted from the car B.

When the car A intending to make a right-turn receives the response signal, the distance to the car B proceeding straight ahead is measured. When the distance is short and attention is needed, the information is provided to the driver of the car B proceeding straight ahead.

The driver of the car A intending to make a right-turn is therefore able to sense a car B proceeding straight ahead, which must be paid attention to, approaching on the opposite lane due to the information mentioned in the above. An information-execution-signal is then transmitted simultaneously with the execution of the information.

The car B proceeding straight ahead, upon receiving the information execution signal, informs the driver of the car B of the reception of the signal with the display device 14.

Therefore, the driver of the car B proceeding straight ahead, upon receiving the information, is able to judge that the driver of the car A intending to make a right-turn has already sensed the existence of car B. This will prevent speculative operation of the cars A and B.

A response signal is transmitted from the car B proceeding straight ahead only when a detection signal is transmitted from the car A intending to make a turn. Therefore, radio waves are not transmitted from car B except when necessary. Therefore, jammed radio waves and unnecessary consumption of energy can be avoided. The existence of car B which must be paid attention to can be detected only upon receiving a necessary signal.

The car A intending to make a turn transmits a detection signal only when the car is preparing for a turn. Therefore, the signal is not constantly transmitted, thereby avoiding unnecessary consumption of energy.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. An information system for vehicles located on opposite lanes from each other for exchanging information between a first vehicle intending to make a turn crossing over the opposite lane and a second vehicle proceeding straight ahead on the opposite lane, comprising:

means mountable to the first vehicle for transmitting a detection signal upon commencing preparation for the turn;

means mountable to the second vehicle for transmitting a response signal upon receiving said detection signal;

means mountable to the first vehicle for judging whether said response signal is received and notifying a driver of the first vehicle of the existence of the second vehicle;

means mountable to the first vehicle for transmitting an information execution signal to the second vehicle based on the judgment of the means for judging; and means mountable to the second vehicle for informing a driver of the second vehicle of the existence of the first vehicle upon receipt of said information execution signal from the first vehicle.

2. The information system according to claim 1, wherein said detection signal transmitted when commencing preparation for the turn is identified by a blinker switch being turned ON in the first vehicle.

3. The information system according to claim 2, further comprising means mountable to the first vehicle for measuring the distance between the first and second vehicles and said means for judging judges whether the means for transmitting an information execution signal should transmit an information execution signal based on the distance measured by the means for measuring.

4. The information system according to claim 2, wherein the means for notifying the driver of the first vehicle and the means for informing the driver of the second vehicle include at least one of a visual expression or an acoustic expression.

5. The information system according to claim 1, further comprising means mountable to the first vehicle for measuring the distance between the first and second vehicles, and said means for judging judges whether the means for transmitting an information execution signal should transmit an information execution signal based on the distance measured by means for measuring.

6. The information system according to claim 5, wherein the means for notifying the driver of the first vehicle and the means for informing the driver of the second vehicle include at least one of a visual expression or an acoustic expression.

7. The information system according to claim 1, wherein the means for notifying the driver of the first vehicle and the means for informing the driver of the second vehicle include at least one of a visual expression or an acoustic expression.

8. A mobile unit detection system by which a vehicle can detect the existence of a mobile unit through communication between the vehicle and the mobile unit, comprising:

judgment means mountable to the vehicle for judging an operating condition of the vehicle;

means mountable to the vehicle for issuing a detection signal based on said operating condition judged by said judgment-means;

means for issuing a response signal mountable to the mobile unit upon receiving said detection signal; and means mounted on the vehicle for detecting the existence of the mobile unit upon the receipt of said response signal.

9. The mobile unit detection system according to claim 8, wherein said judgment means judges whether the vehicle is making a left-turn or a right-turn.

10. The mobile unit detection system according to claim 9, wherein said judgment means judges whether the vehicle is making a left-turn or a right-turn upon detecting operation of a blinker of the vehicle for a predetermined period of time.

11. The mobile unit detection system according to claim 10, further comprising means mountable to the vehicle for judging the distance to the mobile unit upon receipt of said response signal from the mobile unit.

12. The mobile unit detection system according to claim 9, wherein said judgment means judges whether a vehicle is making a left-turn or a right-turn upon detecting deceleration of the vehicle before or after operation of a blinker of the vehicle.

13. The mobile unit detection system according to claim 12, further comprising means mountable to the vehicle for judging the distance to the mobile unit upon receipt of said response signal from the mobile unit.

14. The mobile unit detection system according to claim 9, wherein said detection signal is issued within a predetermined range and toward the left of the vehicle when the judgment means judges that a left-turn is being made and toward the right side of the vehicle when the judgment means judges that a right turn is being made.

15. The mobile unit detection system according to claim 14, further comprising means mountable to the vehicle for judging the distance to the mobile unit upon receipt of said response signal from the mobile unit.

16. The mobile unit detection system according to claim 9, further comprising means mountable to the vehicle for judging the distance to the mobile unit upon receipt of said response signal from the mobile unit.

17. The mobile unit detection system according to claim 8, further comprising means mountable to the vehicle for judging the distance to the mobile unit upon receipt of said response signal from the mobile unit.

* * * * *